US006970557B2

(12) United States Patent
Rodriguez

(10) Patent No.: US 6,970,557 B2
(45) Date of Patent: Nov. 29, 2005

(54) CORDLESS TELEPHONE-TO-SOUND CARD INTERFACE ADAPTER HAVING A HYBRID TRANSFORMER CIRCUIT

(75) Inventor: Luis Ricardo Rodriguez, Wheaton, IL (US)

(73) Assignee: NVG, Inc., Oakbrook, IL (US)

( * ) Notice: Subject to any disclaimer, the term of this patent is extended or adjusted under 35 U.S.C. 154(b) by 38 days.

(21) Appl. No.: 10/743,644

(22) Filed: Dec. 22, 2003

(65) Prior Publication Data

US 2005/0003861 A1    Jan. 6, 2005

(30) Foreign Application Priority Data

Jul. 2, 2003  (MX) .................... PA/a/2003/005992

(51) Int. Cl.[7] ............................ H04M 9/00; H04M 1/00
(52) U.S. Cl. .................... 379/403; 379/394; 379/398; 379/399.01; 379/413.02; 379/413.03; 379/413.04; 379/413.01
(58) Field of Search ............................ 379/394–413.04

(56) References Cited

U.S. PATENT DOCUMENTS

| | | | |
|---|---|---|---|
| 6,108,704 A | 8/2000 | Hutton et al. | |
| 6,138,036 A | 10/2000 | O'Cinneide | |
| 6,169,734 B1 | 1/2001 | Wilson | |
| 6,243,373 B1 | 6/2001 | Turock | |
| 6,424,647 B1 | 7/2002 | Ng et al. | |
| 6,424,648 B1 | 7/2002 | Ng et al. | |
| 6,442,169 B1 | 8/2002 | Lewis | |
| 6,453,027 B1 | 9/2002 | Kang et al. | |
| 6,577,219 B2 * | 6/2003 | Visser | 336/200 |
| 6,731,751 B1 * | 5/2004 | Papadopoulos | 379/399.01 |
| 2001/0001610 A1 * | 5/2001 | McElvaney | 370/463 |
| 2001/0012285 A1 * | 8/2001 | Shaharabani et al. | 370/352 |
| 2001/0028642 A1 | 10/2001 | Veschi | |
| 2002/0164003 A1 | 11/2002 | Chang et al. | |
| 2003/0032393 A1 * | 2/2003 | Kennedy et al. | 455/74.1 |

OTHER PUBLICATIONS

Bigelow, Stephen (Editor), "Understanding Telephone Electronics" (BOOK), 1997, Pub. Butterworth-Heinemann, pp. 68-72.*

* cited by examiner

Primary Examiner—Sinh Tran
Assistant Examiner—Ramnandan Singh
(74) Attorney, Agent, or Firm—John J. Oskorep, Esq.

(57) ABSTRACT

A cordless telephone-to-sound card interface adapter provides a connection between any standard cordless telephone system and a sound card of a computer for PC-to-PC or PC-to-telephone voice communications over the Internet. The interface adapter includes a hybrid transformer circuit for interfacing a two-wire circuit of the cordless telephone and a four-wire circuit of the computer sound card. This hybrid transformer circuit cancels out the voice echo that would otherwise exist due to mismatched impedances between the two media and/or from leakage of the signal being transmitted and received on the same pair of telephone lines. A Universal Serial Bus (USB) plug may be provided to receive a bias voltage from the PC for biasing circuits of the cordless telephone system through the interface adapter. Advantageously, the preferred interface adapter utilizes 100% passive components for a low-cost yet effective means to provide mobility for an end user during voice communications over the Internet.

24 Claims, 6 Drawing Sheets

CORDLESS TELEPHONE-TO-SOUND CARD INTERFACE ADAPTER HAVING A HYBRID TRANSFORMER CIRCUIT

CROSS-REFERENCE TO RELATED APPLICATION

This application claims priority to Mexican patent application entitled "Device Allowing Connection of Wireless Telephone to Computer for Internet Telephony" having Serial No. PA/a/2003/005992 and filing date of Jul. 2, 2003.

BACKGROUND

1. Field of the Invention

The present invention relates to a cordless telephone-to-sound card interface adapter having a hybrid transformer circuit, which provides mobility to an end user during voice communications over the Internet.

2. Description of the Related Art

Historically, a determining factor in the low usage of Internet telephony usage was attributed to poor voice quality. Nevertheless, in the last few years major progress has been made in this area to address the voice quality issues. These improvements have motivated Internet users, especially people or companies with limited budgets for international long-distance calls, to take advantage of the service. The service advantageously provides savings of up to 70% over the traditional calling system, in addition to the relatively low rates offered by Internet providers and traditional local-call telephony.

The present application concerns an interface adapter which connects between a cordless telephone system and a computer for facilitating voice communications over the Internet using Voice over IP (VoIP) communications. Currently, there are at least two such interface adapter devices on the U.S. market—namely, the Phonebridge device and the ChatBridge device. The ChatBridge device utilizes a Universal Serial Bus (USB) interface, a digital signal processor (DSP), and sophisticated software to emulate an application on the computer for canceling echo so that a sound card is not needed for voice communication. With the Phonebridge device, the computer must be equipped with a sound card to establish voice communication but sophisticated electronics are also required for its operation.

What is needed is a low-cost but effective interface adapter which connects between a cordless telephone and a computer for facilitating voice communications over the Internet using VoIP communications.

SUMMARY

What I have developed is a cordless telephone-to-sound card interface adapter that will allow Internet users to establish PC-to-telephone and PC-to-PC voice conversations over the Internet by means of instant messaging using their PC and any standard cordless telephone, freeing them from sitting idly in front of their PC and offering mobility while they talk anywhere in their homes. The interface adapter utilizes passive components for its operation, which makes it more affordable and leads to fewer risks of electrical discharges. Preferably, the interface adapter includes a hybrid transformer circuit for matching the impedance between a PC sound card (600Ω impedance of the speaker line and 10 KΩ impedance of the microphone line) and the cordless telephone system (450Ω nominal impedance), thereby canceling out voice echo during telephone conversations over the Internet. Advantageously, the interface adapter provides a low-cost yet effective means to provide mobility for an end user during voice communications over the Internet.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

As described herein, a cordless telephone-to-sound card interface adapter of the present application is configured to operate with any PC equipped with a sound card and any standard telephone, which is preferably a cordless telephone system to provide the user with mobility. In one specific implementation, the interface adapter includes a hybrid transformer circuit having two hybrid transformers with multiple 600Ω coils and an impedance matching circuit having a precision resistor and an optional capacitor. The primary function of the hybrid transformer circuit, which operates through electromagnetic coupling like other transformers, is to effect the conversion from two wires (the cordless telephone) to four wires (the computer sound card) with suitable impedance matching, thereby separating the transmitted voice from the received voice without producing voice echo toward the origin. The interface adapter includes a speaker plug for a receive signal (Rx) and a microphone plug for a transmit signal (Tx) which are connected to the computer's sound card. A telephone interface of the interface adapter is connected to the cordless telephone system to facilitate voice conversation over the Internet with end-user mobility. The interface adapter may further include a Universal Serial Bus (USB) plug for biasing circuits of the cordless telephone system through the interface adapter. Advantageously, the interface adapter of the present application is a simple low-cost means for providing mobility to an end user for voice communications over the Internet. With convenient cordless telephone mobility, this adapter facilitates significant savings in long distance telephone services.

Figure 1:
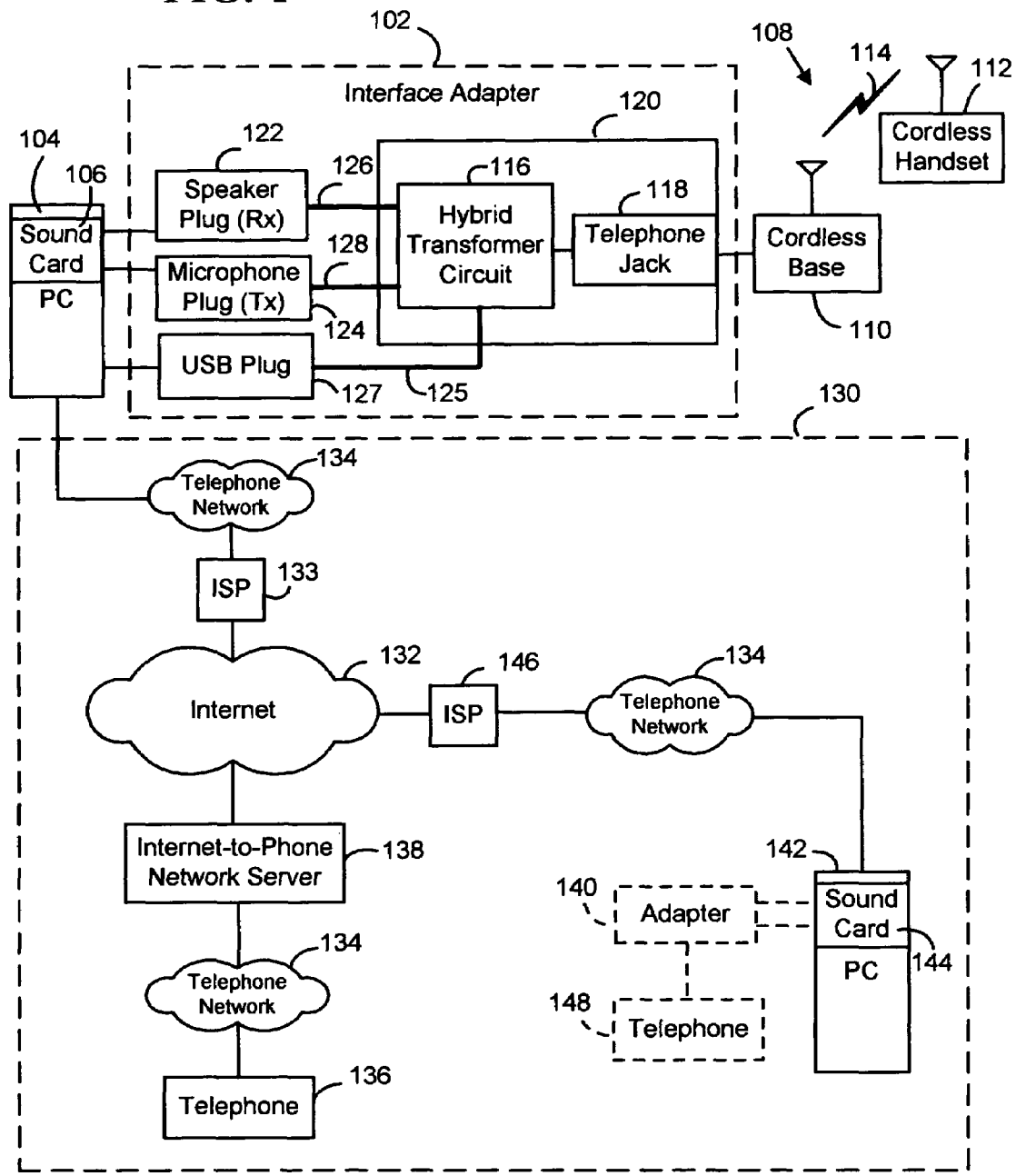
FIG. 1 is a block diagram illustration of a voice communication system which utilizes a cordless telephone-to-sound card interface adapter of the present application.

FIG. 1 is an illustration of a voice communication system 100 which utilizes a cordless telephone-to-sound card interface adapter 102 of the present application. In general, interface adapter 102 helps facilitate voice communications between a first end user of a cordless telephone system 108 and a second end user of a telephone 136/148 or a computer 142 using instant messaging communications over the Internet.

Figure 2:
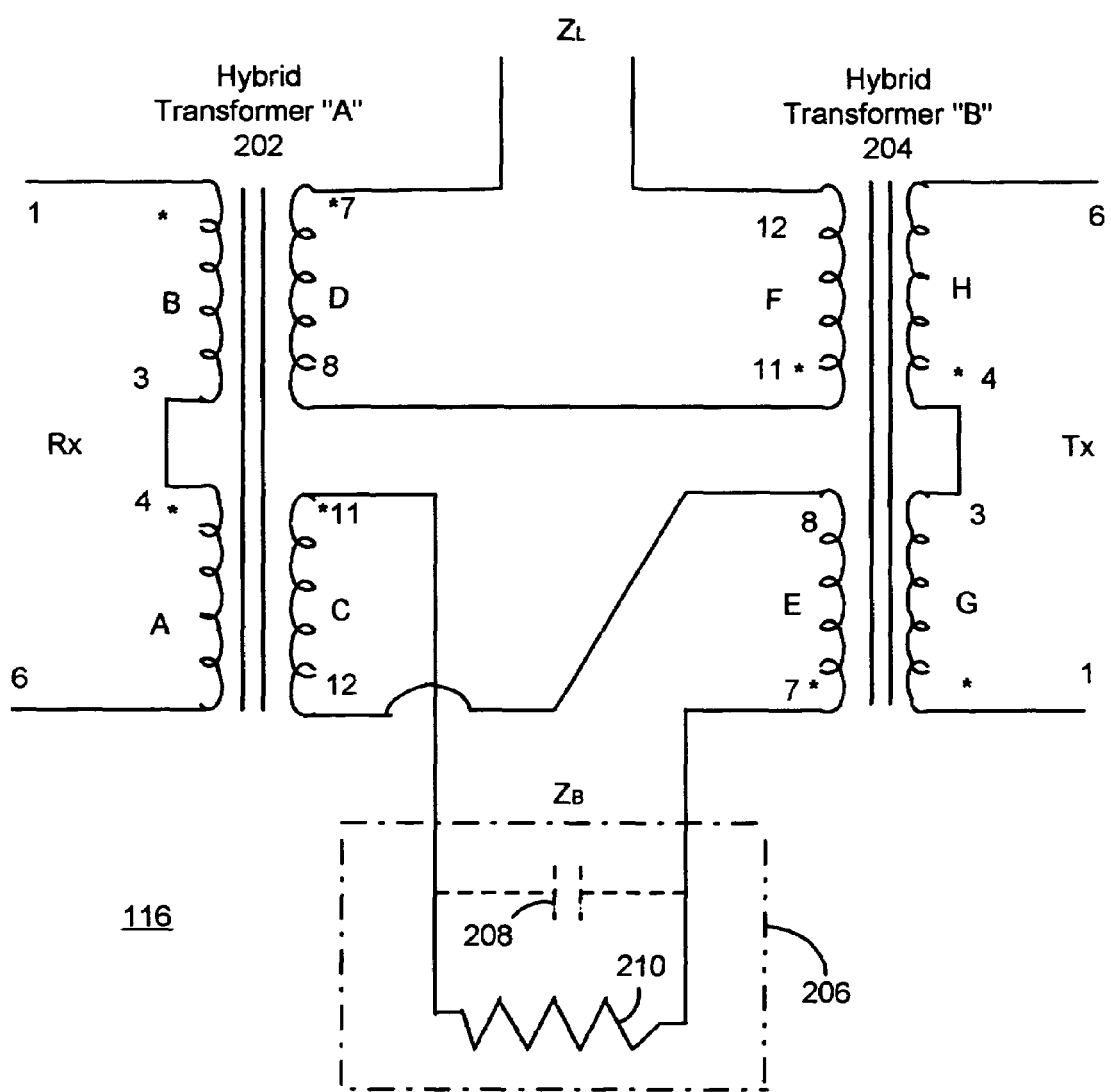
FIG. 2 is a schematic diagram of a hybrid transformer circuit of the interface adapter of FIG. 1 in a first embodiment.
Figure 3:
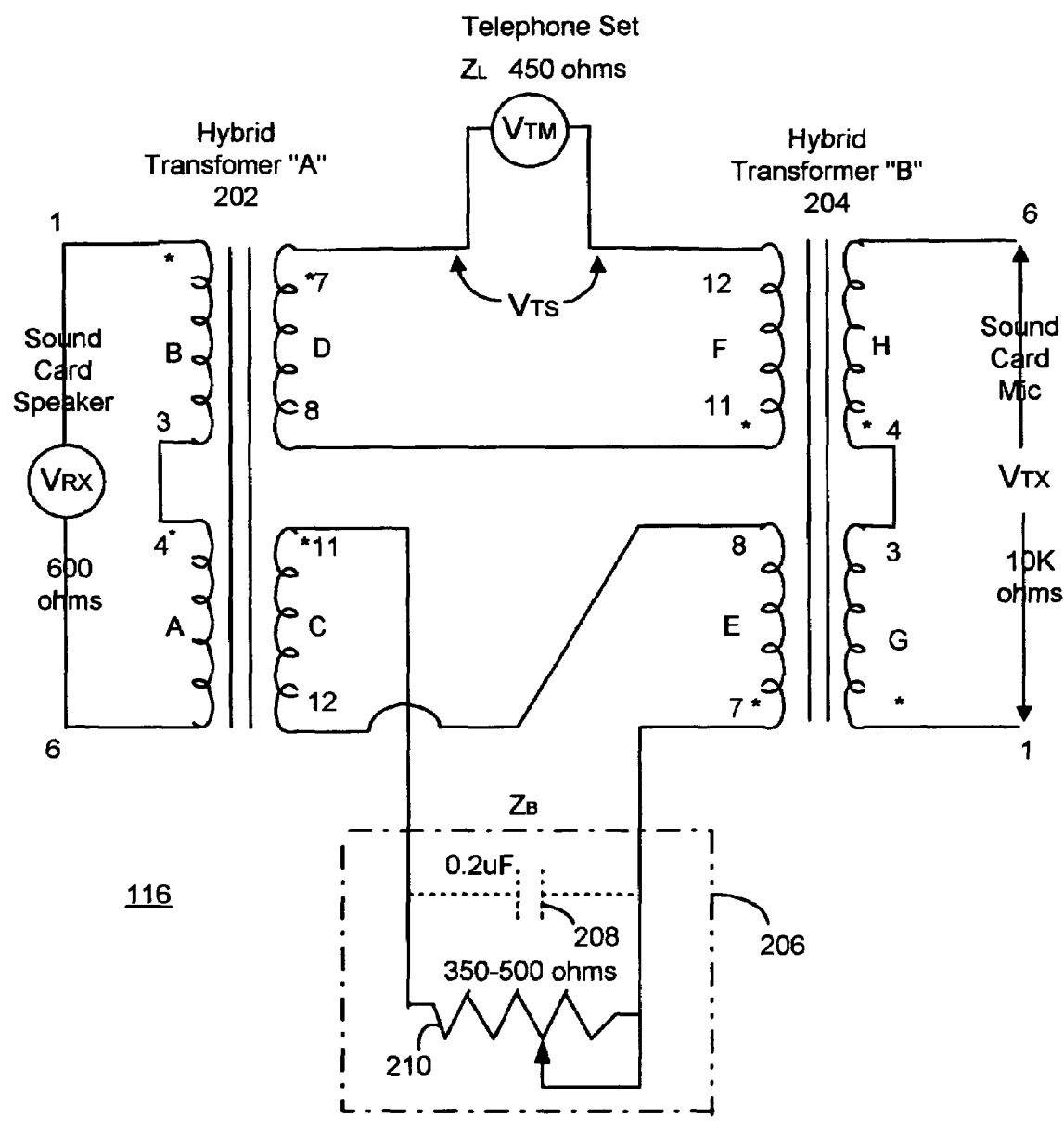
FIG. 3 is a schematic diagram of the hybrid transformer circuit of FIG. 2, showing relevant equivalent circuit information when coupled to a cordless telephone system and a sound card of a computer.
Figure 4:
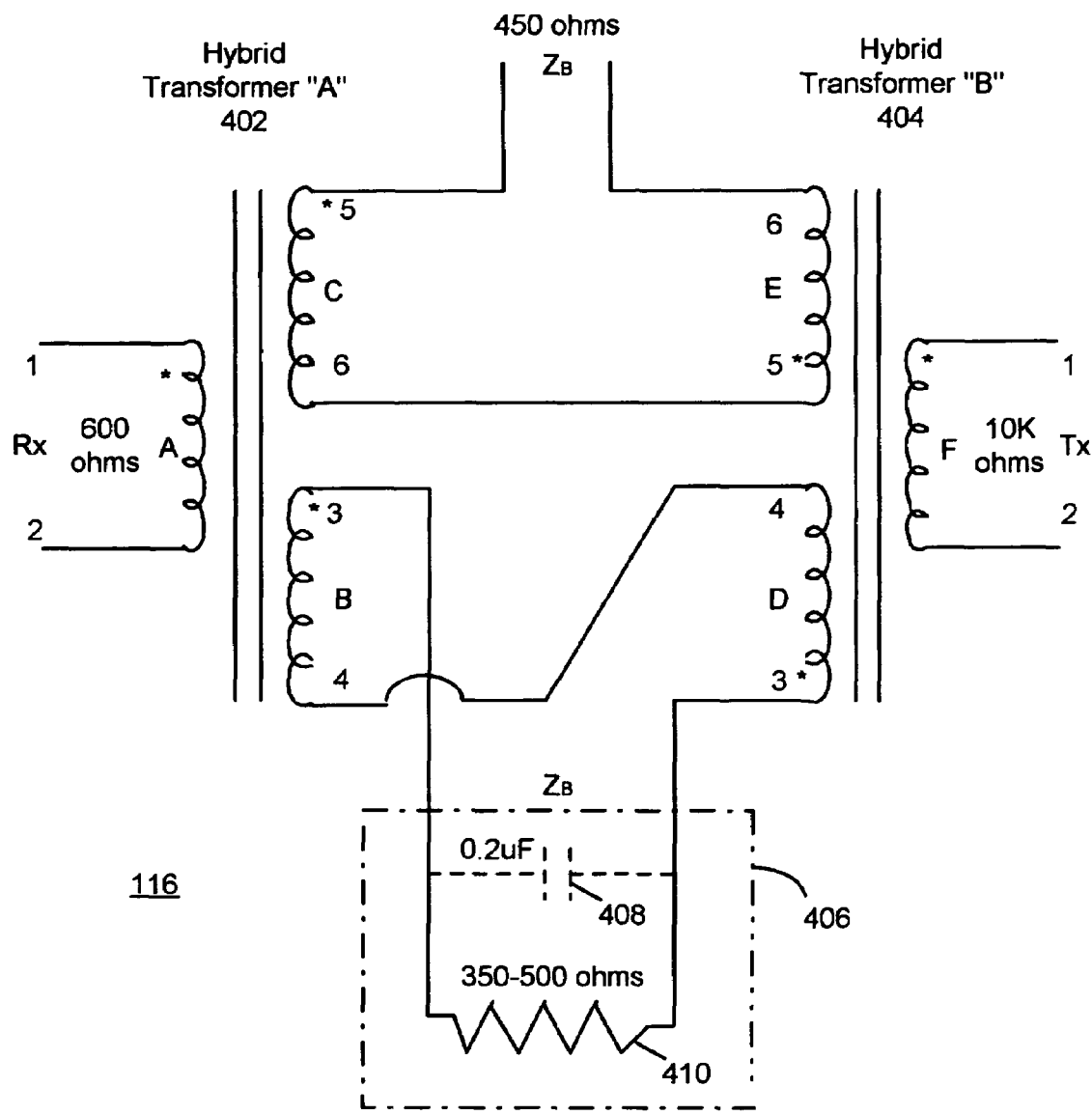
FIG. 4 is a schematic diagram of the hybrid transformer circuit for the interface adapter of FIG. 1 in a second embodiment.

Interface adapter 102 includes a hybrid transformer circuit 116 as well as a telephone jack 118, a speaker plug 122, a microphone plug 124, and a Universal Serial Bus (USB) plug 127 which are coupled to hybrid transformer circuit 116. Hybrid transformer circuit 116, which will be described later in detail in relation to FIGS. 2–4, is carried and contained entirely within a housing unit 120 (e.g. a molded hard plastic housing unit). Telephone jack 118 is carried on a side edge of housing unit 120 and is coupled to a conventional cordless telephone system 108 through a telephone cord. Preferably, telephone jack 118 is of the RJ-11 (female) type. Cordless telephone system 108 includes a cordless base unit 110 and at least one cordless handset unit 112. As is conventional, cordless base unit 110 and cordless handset unit 112 communicate via radio frequency (RF) signals 114 to provide mobility to an end user of cordless handset unit 112.

The other end of interface adapter 102 is configured to connect to a standard sound card 106 of a computer 104, such as a Personal Computer (PC). In particular, speaker plug 122 and microphone plug 124 of interface adapter 102 are configured to interface with sound card 106. A speaker plug cable 126 extends from housing unit 120 and terminates with speaker plug 122. Similarly, a microphone plug cable 128 extends from housing unit 120 and terminates with microphone plug 124. Preferably, speaker plug 122 and microphone plug 124 are both male connectors of the ⅛" miniplug type. Sound card 106 has suitable female connectors of the ⅛" minijack type to receive the ⅛" miniplugs from interface adapter 102. In addition, USB plug 127 is configured to interface with a USB jack on the PC for receiving a bias voltage to bias circuits of cordless telephone system 108 through interface adapter 102. Preferably, speaker plug cable 126, microphone plug cable 128, and USB plug cable 125 are actually bound together as a single cable which extends from housing unit 102 between about 24–40 inches (i.e. about 61–101 cm).

Computer 104 connects to the Internet 132 through a local Internet Service Provider (ISP) 133. Sound card 106 of computer 104 converts analog voice signals from interface adapter 102 (which originated from cordless telephone system 108) into digital data for communication over the Internet 132. Conversely, sound card 106 converts digital voice data from the Internet 132 (which originated from telephone 136 or computer 142) into analog voice signals to interface adapter 102. A software application (not shown) which resides on computer 104 is utilized to help facilitate an instant voice messaging service, such as that service provided by MSN™ Messenger, America On-Line (AOL)™ Instant Messenger™, or Yahoo™ Messenger, or Skype™, which is based on Voice over IP (VoIP) technology.

Elements which exist outside of the home or office of the end user of cordless telephone system 108, or outside of the end user's purview 130, include the Internet 132, ISPs 133 and 146, telephone network 134, Internet-to-phone network server/gateway 138, as well as other end user's telephones 136 and 148, interface adapter 140, and computer 142. The other end user in the voice conversation may employ one of three alternatives: (1) telephone 136 via the standard telephone network 134; (2) computer 142 via the Internet 132 using a standard speaker/microphone attachment (attachment not shown) to computer 142; or (3) telephone 148 via the Internet 132 which is coupled to computer 142 via interface adapter 140.

If computer 142 with the speaker/mic attachment is utilized, the speaker/mic attachment is coupled to a sound card 144 of computer 142 which is coupled to the Internet 132 through local ISP 146. In this scenario, the voice communication does not require the use of telephone network 134 at all, except for any telephone connections established between computers 104/142 and their corresponding ISPs 133/146. The likelihood of undesirable echo generation in this scenario is very high if no echo cancellation is utilized by computer 104, since any voice signals from the speaker line will be fed to the microphone line and back to the origin. Suitable standard headphone sets are recommended for use so that acoustical echo will be eliminated.

On the other hand, telephone 148 and interface adapter 140 may be utilized with computer 142. Interface adapter 140 is similar in make and functionality as interface adapter 102 and, preferably, telephone 148 is a cordless telephone system (i.e. like cordless telephone system 108). In this scenario, the voice communication also does not require the use of telephone network 134 at all, except for any telephone connections established between computers 104/142 and their corresponding ISPs 133/146.

Using the last alternative, the end user of cordless telephone system 108 may have a subscription with an Internet-to-telephone network service provider, such as Net2Phone of Newark, N.J., U.S.A.; Callserve of London in the U.K.; or iConnectHere of DeltaThree, Inc. Such a service utilizes an Internet-to-telephone network server or gateway 138 and/or other devices for converting VoIP data packets from the Internet 132 into conventional telephone signals for use over telephone network 134, and vice versa. With such a subscription, the end user of cordless telephone system 108 may communicate over the Internet 132 and telephone network 134 with any other telephone user including the end user of telephone 136.

FIG. 2 is a schematic diagram of hybrid transformer circuit 116 of FIG. 1. Hybrid transformer circuit 116 of FIG. 2 includes a first hybrid transformer 202, a second hybrid transformer 204, and an impedance matching circuit 206. Hybrid transformers are used to convert a bi-directional two-wire signal into one-way four-wire signals. In the embodiment of FIG. 2, each hybrid transformer 202 and 204 is a 600Ω—600Ω single-hybrid transformer which connects a two-wire port (telephone set) to a four-wire transmit and receive port (PC sound card). Preferably, hybrid transformers 202 and 204 are single hybrid transformers of model SPT-180 available from Prem Magnetics, Inc., located in McHenry, Ill., U.S.A. Mouser Electronics located in Mansfield, Tex., U.S.A. may be another reliable source for hybrid transformers (e.g. Model TL028). However, any suitable hybrid transformer from any suitable manufacturer may be utilized. FIG. 3 shows the same hybrid transformer circuit 116 coupled in its environment which is illustrated by equivalent circuit information (i.e. equivalent circuit voltages and impedances).

In FIGS. 2–3, hybrid transformer 202 has a pair of mutually-coupled coils which include mutually-coupled coils B and D and mutually-coupled coils A and C formed along the same core. Similarly, hybrid transformer 204 has a pair of mutually-coupled coils which include mutually-coupled coils F and H and mutually-coupled coils E and G formed along the same core. A terminal 1 of coil B and a terminal 6 of coil A of hybrid transformer 202 are coupled to speaker plug 122 (FIG. 1), whereas a terminal 1 of coil G and a terminal 6 of coil H of hybrid transformer 204 are coupled to microphone plug 124 (FIG. 1). A terminal 7 of coil D and a terminal 12 of coil F are coupled to two-line telephone jack 118 (FIG. 1). A terminal 8 of coil D of hybrid transformer 202 is coupled to a terminal 11 of coil F of hybrid transformer 204. A terminal 12 of coil C of hybrid transformer 202 is coupled to a terminal 8 of coil E of hybrid transformer 204, which makes coils C and coils E reverse-coupled. A terminal 11 of coil C of hybrid transformer 202 and a terminal 7 of coil E of hybrid transformer 204 are coupled to impedance matching circuit 206 which has an impedance $Z_B$. In this embodiment, impedance matching circuit 206 includes a resistor 210 and an optional capacitor 208 coupled in a parallel configuration as shown.

Assuming a change of current in coil A, a change will be produced in the magnetic field of the same coil which, in turn, produces a change of voltage in coil C on the same transformer core. When coil C is connected in a circuit, changes in voltage in the circuit will generate a change in current flow. Therefore, the pattern of change of current in the primary coil A is reproduced in the transformer's secondary coil C without both circuits having to be physically connected. Note that the ratio of incoming voltage to outgoing voltage (and of incoming current to outgoing current) depends on the ratio of the number of turns of the primary and secondary windings. This makes it possible to equalize the impedance between the coupled circuits (i.e. the sound card and the cordless telephone) as $N^2 \times Zp$, where N is the ratio of secondary-to-primary coil turns of the transformer and Zp is the impedance of the primary coil. Impedance matching is important to reduce the reflection of transmitted signals and corresponding loss of power. Preferably, the ratio N for both transformers 202 and 204 is between 1:1.60 (+/−2%) using the SPT-180 type transformers.

A voice signal is received from the sound card (i.e. speaker line) that is applied to terminals 1 and 6 of transformer A 202, next to be coupled inductively to its coils C and D owing to the flow of current through coils A and B. The voltage induced in coil D causes current to flow through the two-wire circuit connected to terminal 7 of hybrid transformer 202 and terminal 12 of hybrid transformer 204, to be transmitted further on. This same current also flows through coil F, which causes an induced voltage in coil H. Likewise, the voltage of the voice signal induced in coil C causes current to flow through impedance matching circuit 206 and coil E. The impedance $Z_B$ of impedance matching circuit 206 is tuned with precision to equalize an impedance $Z_L$ from the telephone set line, thereby obtaining zero return of the transmitted signal toward its origin. That is, the impedance $Z_B$ of impedance matching circuit 206 is set during the design phase to match the line impedance $Z_L$ which may vary slightly from device to device. Given that $Z_B$ is equal to $Z_L$, the number of turns in coils C and D are equal in number, and the number of turns in coils E and F are also equal in number, the same flow of current exists in the circuits of coils C and E and D and F, thereby yielding the same voltage induced in coils G and H (each of which also have the same number of turns).

In general, impedance matching circuit 206 may have an impedance $Z_B$ between about 350 and 500Ω. Preferably, the impedance $Z_B$ may be set to between about 457 and 467Ω. Most preferably, a fixed high-precision resistor (e.g. preferably a 1% tolerance or less) having a resistance of about 467Ω is utilized. Capacitor 208, which is entirely optional, may have any suitable capacitance (e.g. about 0.2 $\mu$F) to filter out any undesirable high-frequency components.

Coils C and E have their connections inverted from the connections of coils D and F so that any voltage induced in coil G is opposite in phase to the voltage induced in coil H, opposing it and resulting in the cancellation of both. The signal appearing at terminals 1 and 6 of hybrid transformer 202 (i.e. speaker line) is transmitted to terminals 7 and 12 without appearing at terminals 1 and 6 of hybrid transformer 204 (i.e. microphone line). The level of the signal transmitted at terminals 7 (hybrid transformer 202) and 12 (hybrid transformer 204) (i.e. the telephone set line) is half the level of the incoming signal at terminals 1 and 6 of hybrid transformer 202 (i.e. speaker line), as the other half of the signal is dissipated in impedance matching circuit 206. When a voice signal is received from the telephone set at terminals 7 and 12 of hybrid transformers 202 and 204, its magnitude at both the sound card speaker line and the sound card microphone line will be only half of the original signal. The reason is that coil D of hybrid transformer 202 and coil F of hybrid transformer 204 are connected in series with the telephone set as shown. The level of the voice signal injected at the sound card microphone input (terminals 1 and 6 of hybrid transformer 204) may be increased at the other end using a PC volume control. When ZL=ZB, any signal coming from the sound card speaker line through coils A and B of hybrid transformer 202 will establish voltages in coils H and G of hybrid transformer 204. These voltages will be equal and opposite in value (i.e. 180° out-of-phase), canceling each other out with resulting echo cancellation. Ideally, no signal originating from the sound card speaker line will be allowed to return back to its origin through the sound card microphone.

What has been shown and described reveals that the basis of hybrid transformer circuit 116 is the multiple windings or coils that make up the transformers. Voice signals are transferred between the same coils through electromagnetic coupling and, where couplings with opposite electromagnetic fields result, they will be canceled out. That is, by using the basic principle of the law of electromagnetism (equal but opposite-phase electromagnetic fields), the voice echo generated by transmitting two different voice signal paths simultaneously can be canceled out. Therefore, two superposed alternating current (AC) signals can be transmitted by a single pair of wires and recovered individually without interfering with each other through the use of hybrid transformer circuit 116.

Referring specifically to FIG. 3, $V_{TM}$ is the voltage from the telephone set microphone, $V_{TS}$ is the voltage to the telephone set speaker, $V_{RX}$ is the voltage from the sound card speaker output, and $V_{TX}$ is the voltage to the sound card microphone input. When the speaker line is driven from the PC, then $V_{TS}=0.55V_{RX}$ and $V_{TX}=0$ as long as $Z_B=Z_L$. If $Z_B$ were different from $Z_L$, then $V_{TX}$ would be a non-zero value which results in a reflected echo signal back to the other end, which is undesirable. When the microphone line is driven, a voice signal from the telephone set is being injected into the microphone line with a voltage of $V_{TX}=0.5V_{TM}$. Even though the voltage of the signal coming from the telephone set is reduced by one half, its level is still sufficient to be transmitted through the microphone line which can be amplified using a volume control on the PC on the other end.

Electromagnetic mutual coupling between hybrid transformers is reduced by improving the separation between the receiver and the transmitter in the four-wire circuit. This results in a reduction of the signal reflection. "Hybrid balance", which is terminology related to return loss, is the degree of electrical symmetry between two impedances connected to two conjugate sides of a hybrid circuit for minimizing cross-over signals between the transmit and receive sides. This is achieved by utilizing appropriate transformer turn ratios, appropriate core materials, as well as appropriate inductances. The symmetry of the signals transmitted and received is improved as impedance $Z_B$ of the balance network is carefully equalized with the impedance $Z_L$ from telephone set line for all transmitted frequencies of interest, as by using precise construction techniques in the transformer coils (i.e. precision in the ratio of winding turns during manufacture of the transformers).

The termination of impedance between the sound card and the cordless telephone is provided by coupling of the hybrid system on each side of the transmission/reception with an appropriate balance network. Leakage and inductances for the cores of the transformers and the capacitances between coils will result in reflection of signals at frequencies at which their impedances are significant. If these effects are ignored and the ratio of the coils is assumed to be equal, the termination of impedances jointly with the appropriate balance network will achieve echo cancellation and a clear and comfortable voice conversation over the Internet.

The first embodiment described in relation to FIGS. 2–3 utilizes hybrid transformers having relatively large cores, such as SPT-180-type transformers previously described. However, a second embodiment uses transformers with relatively smaller cores, such as SPT-060 type transformers which are also available from Prem Magnetics, Inc. or Model TL028 transformers from Mouser Electronics. This second embodiment is shown and described in relation to FIG. 4.

The hybrid transformer circuit 116 of FIG. 4 includes a hybrid transformer 402, a hybrid transformer 404, and an impedance matching circuit 406. Hybrid transformer 402 includes a coil A which is inductively coupled to both coils B and C formed along the same core. Similarly, hybrid transformer 404 includes a coil F which is inductively coupled to both coils D and E formed along the same core. Terminals 1 and 2 of coil A of hybrid transformer 402 are coupled to speaker plug 122 (FIG. 1), whereas terminals 1 and 2 of coil F of hybrid transformer 404 are coupled to microphone plug 124 (FIG. 1). A terminal 5 of coil C of hybrid transformer 402 and a terminal 6 of coil E of hybrid transformer 404 are coupled to two-line telephone jack 118 (FIG. 1). A terminal 6 of coil C of hybrid transformer 402 is coupled to a terminal 5 of coil E of hybrid transformer 404. A terminal 4 of coil B of hybrid transformer 402 is coupled to a terminal 4 of coil D of hybrid transformer 404, making coils B and D reverse-coupled. A terminal 3 of coil B of hybrid transformer 402 and a terminal 3 of coil D of hybrid transformer 404 are coupled to impedance matching circuit 406 which has an impedance $Z_B$. In this embodiment, impedance matching circuit 406 includes a resistor 410 and an optional capacitor 408 (optional) coupled in a parallel configuration as shown. The impedance $Z_B$, capacitor 408, and resistor 410 may be the same or similar components as described in relation to FIGS. 2–3.

Although the physical dimensions of the two transformers of FIG. 4 are different, their behavior and performance in this application are very similar. And although the number of coils in the second configuration of FIG. 4 differs by two (one in transmitting part Tx and the other in receiving part Rx), the explanation described above in relation to FIGS. 2–3 is applicable here as well. For the purposes of mass production of the interface adapter, it has been considered more suitable to use a configuration with SPT-060 hybrid transformers (Prem Magnetics) or TL028 hybrid transformers (Mouser Electronics) due to the great economic savings it represents for manufacturing relative to the use of the SPT-180 transformers. In this embodiment, the ratio N for both transformers 402 and 404 is between 1:1.60 (+/−2%) for the SPT-060 type.

Figure 5:
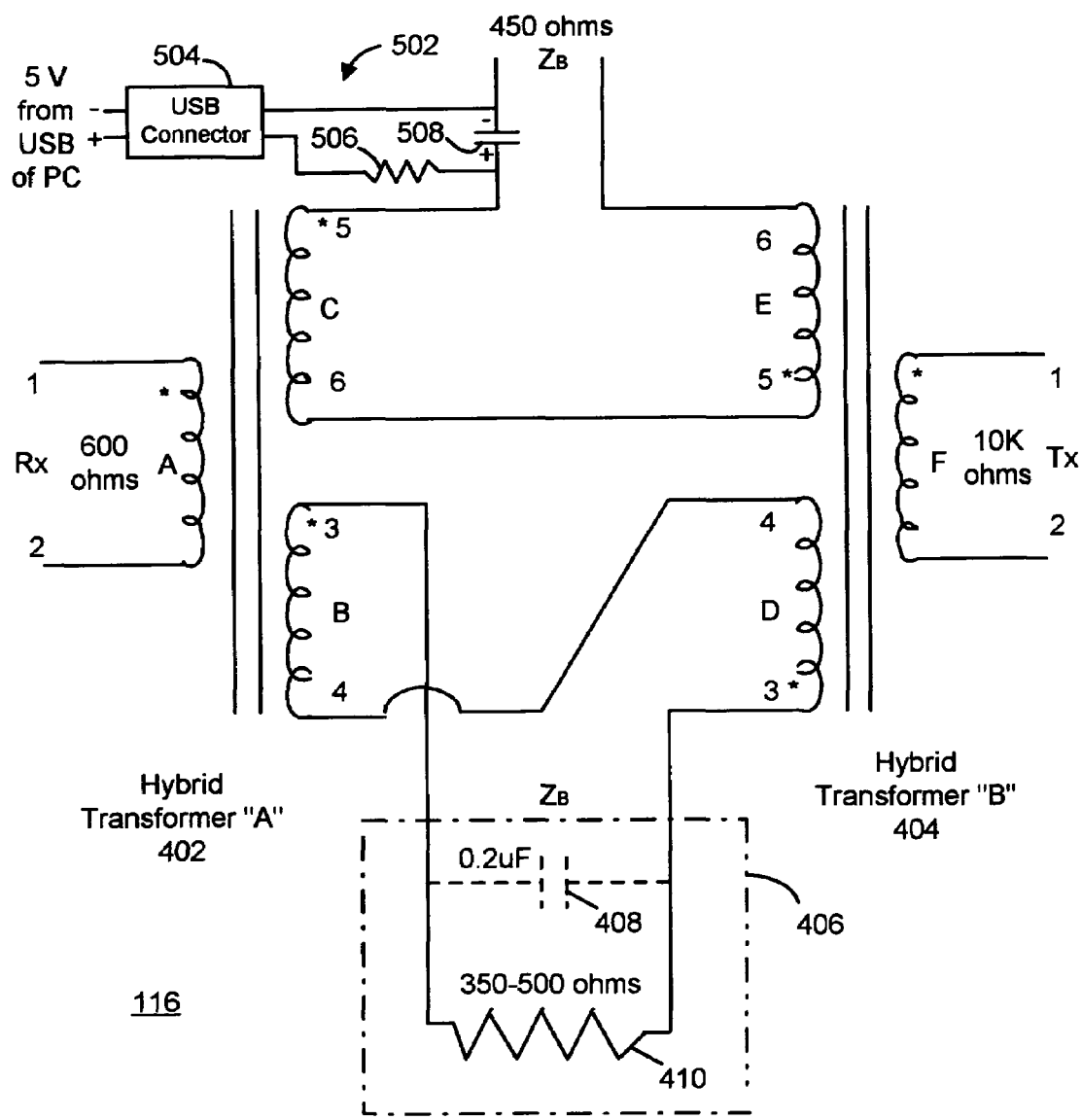
FIG. 5 is the schematic diagram of the hybrid transformer circuit of FIG. 4 which further includes a voltage bias interface.

FIG. 5 is a schematic diagram of the hybrid transformer circuit 116 of FIG. 4 which further includes a voltage biasing interface 502. Although shown with respect to FIG. 5, voltage biasing circuit 502 may be utilized in hybrid transformer circuit 116 of FIGS. 2 and 3 as well. Voltage biasing interface 502 is utilized for biasing circuits of some cordless telephone sets which require it; however not all cordless telephone system will require such biasing. In general, voltage biasing interface 502 is adapted for coupling to a voltage source which provides a bias voltage to the cordless telephone system through hybrid transformer circuit 116. More particularly, voltage biasing interface 502 utilizes a USB plug 504 and cable which is coupled to one of the lines of the telephone interface (RJ-11 female jack) of the interface adapter. As particularly shown in FIG. 5, USB plug 504 is coupled through terminal 5 of coil C of hybrid transformer 402. USB is a high-performance networking standard which is based on a serial bus architecture. Most new computers and associated peripheral devices like printers and scanners support USB.

USB plug 504 is adapted to be connected to a corresponding USB jack on the computer/PC. The voltage bias obtained from the USB is about 5 volts (+5 volts line and ground line), which provides a sufficient voltage bias for most (if not all) of such cordless telephone sets. The USB cable extends from housing 120 (FIG. 1) in a manner similar to cables 126 and 128 (FIG. 1). Preferably, as described above, the USB cable and cables 126 and 128 (FIG. 1) are integrally combined (bundled) along a single cable strand and split at the end into separate connectors. Note that only positive and negative terminals of USB plug 504 are coupled to hybrid transformer circuit 116; all other lines (e.g. data lines) of USB plug 504 are not utilized. A capacitor 508 of the electrolytic type is coupled between the telephone set line and terminal 5 (coil C) of hybrid transformer 402 as shown in FIG. 5; the positive and negative terminals from USB plug 504 are coupled across this capacitor 508. Also, a current-limiting resistor 506 is coupled along the positive terminal as shown in FIG. 5. Preferably, the resistance of resistor 506 is about 62Ω (rated at ¼ Watt) and the capacitance of capacitor 508 is about 470 μF (rated at 6.3 volts). It is important to note that, even though voltage biasing interface 502 is utilized in this embodiment, hybrid transformer circuit 116 of FIG. 5 still consists entirely of passive components.

Figure 6:
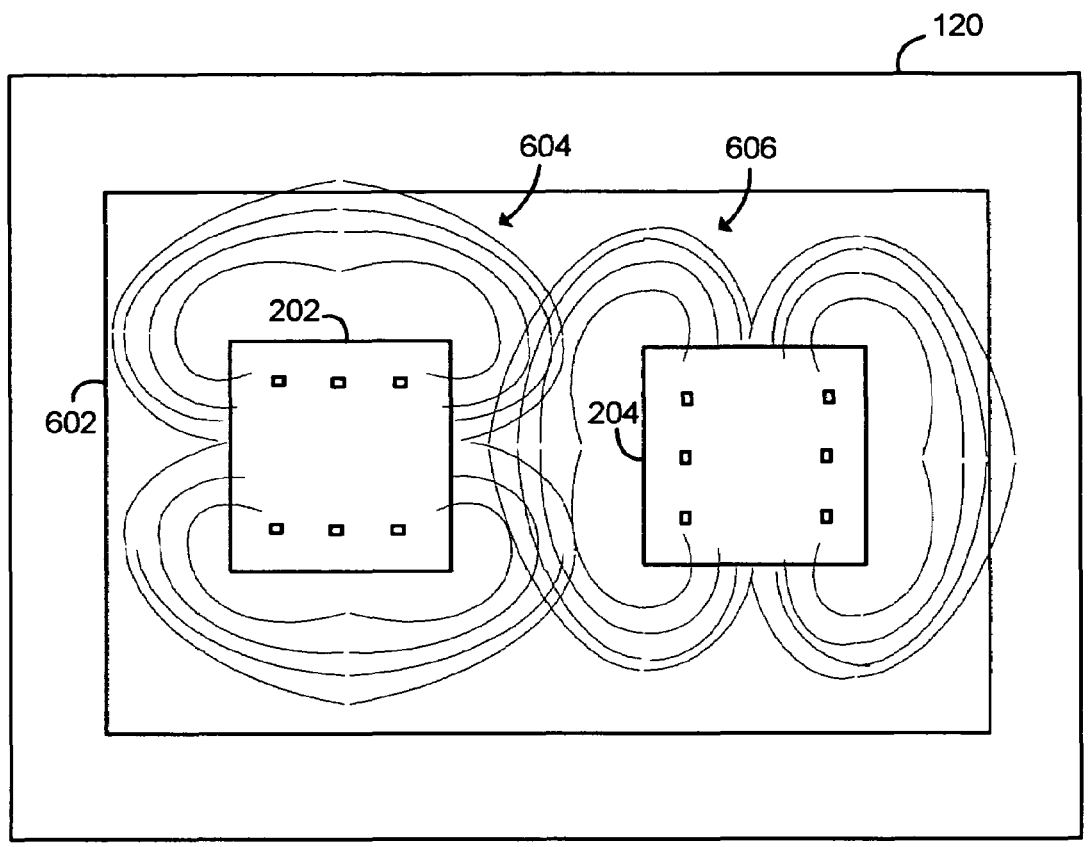
FIG. 6 is a block diagram illustration of the two hybrid transformers of the hybrid transformer circuit, which are physically oriented 90° out-of-phase in the housing so as to reduce electromagnetic interference with one another.

Turning now to FIG. 6, an illustration of hybrid transformers 202 and 204 of the hybrid transformer circuit in housing unit 120 is shown. Hybrid transformers 202 and 204 are mounted and coupled on a printed circuit board (PCB) 602 which is contained within housing unit 120. Hybrid transformers 202 and 204 must be positioned relatively close together on PCB 602 to ensure that the size of the interface adapter is small. However, hybrid transformer 202 has electromagnetic waves 604 that radiate primarily out of one side thereof, and hybrid transformer 204 similarly has electromagnetic waves 606 that radiate primarily out of another side thereof. Positioning hybrid transformers 202 and 204 close to one another would tend to cause interference, which would provide an impedance mismatch and increase voice echo.

In the present application, however, hybrid transformers 202 and 204 are oriented so as to be perpendicular to one another (i.e. rotated 90° out-of-phase with each other) to reduce or minimize mutual electromagnetic coupling. Thus, hybrid transformers 202 and 204 may still be positioned relatively closely on PCB 602 to conserve space within housing unit 120 without electromagnetically interfering with one another. In this embodiment, hybrid transformers 202 and 204 each have dimensions of about ½" by ½" (1.27 cm), are spaced apart by about 1 inch (2.54 cm), and the dimension of PCB 602 is about 1.1 by 2.3 inches (2.8 by 5.8 cm). As apparent, the interface adapter can be made relatively smaller in size without adversely affecting the performance of the adapter. Although being rotated 90° out-of-phase is preferred for good results, any suitable rotation between 45°–135° may be utilized to reduce undesirable electromagnetic coupling. Thus, hybrid transformer 202 and 204 are physically oriented within housing unit 120 so as to reduce electromagnetic interference with one another for conserving space within the housing unit 120.

What has been described herein is a cordless telephone-to-sound card interface adapter that will allow Internet users to establish PC-to-telephone and PC-to-PC voice conversations over the Internet by means of instant messaging using their PC and any standard cordless telephone, freeing them from sitting idly in front of their PC and offering mobility while they talk anywhere in their homes. Most preferably, the interface adapter utilizes 100% passive components for its operation, which makes it more affordable and leads to fewer risks of electrical discharges. The interface adapter consists of a hybrid transformer circuit for matching the impedance between a PC sound card (600Ω impedance from the speaker and 10 K Ω impedance from the microphone) and the cordless telephone (nominal impedance of 450Ω), thereby minimizing and/or canceling out voice echo during telephone conversations over the Internet. Advantageously, the interface adapter provides a low-cost yet effective means to provide mobility for an end user during voice communications over the Internet. With convenient cordless telephone mobility, this adapter facilitates significant savings in long distance telephone services.

The above-described embodiments of the present application are examples only. Those of skill in the art may effect alterations, modifications and variations to the particular embodiments without departing from the scope of the application. For example, although the use of a cordless telephone system is a primary focus of the present application, the interface adapter of the present invention may be utilized with any standard telephone set. Finally, the invention described herein in the recited claims intend to cover and embrace all suitable changes in technology.

What is claimed is:

1. A cordless telephone-to-sound card interface adapter for providing mobility to an end user during voice communications over the Internet, comprising:
   a housing unit;
   a hybrid transformer circuit carried and contained within the housing unit;
   a telephone jack carried along a side edge of the housing unit for coupling to a cordless telephone system using a telephone cord;
   a speaker plug cable which extends from the housing unit and terminates in a ⅛ inch speaker miniplug which is configured to connect with a speaker jack of a computer sound card;
   a microphone plug cable which extends from the housing unit and terminates in a ⅛ inch microphone miniplug which is configured to connect with a microphone jack of the computer sound card;
   the hybrid transformer circuit including:
   a first hybrid transformer having a single coil A inductively coupled to two coils B and C which are formed along the same core;
   a second hybrid transformer having a single coil F inductively coupled to two coils D and E which are formed along the same core;
   an impedance matching circuit;
   a first terminal of the coil C and a first terminal of the coil E coupled to the telephone jack;
   a second terminal of the coil C coupled to a second terminal of the coil E;
   first and second terminals of the coil A coupled to the speaker plug cable;
   first and second terminals of the coil F coupled to the microphone plug cable;
   a first terminal of the coil B coupled to a second terminal of the coil D; and
   a second terminal of the coil B and a first terminal of the coil D coupled to the impedance matching circuit.

2. The interface adapter of claim 1, which consists of passive components.

3. The interface adapter of claim 1, wherein the hybrid transformer circuit matches impedances from the cordless telephone system and the computer sound card for voice echo cancellation.

4. The interface adapter of claim 1, wherein the first and the second hybrid transformers have a turns ratio of 1:1.60.

5. The interface adapter of claim 1, wherein the first and the second hybrid transformers have a turns ratio of 1:1.60 and the impedance matching circuit has an impedance of between about 350–500Ω.

6. The interface adapter of claim 1,
   wherein the impedance matching circuit consists of a resistor having a resistance of about 467Ω and a tolerance of 1% or less.

7. The interface adapter of claim 1,
   wherein the impedance matching circuit comprises a resistor having a resistance of about 467Ω.

8. The interface adapter of claim 1,
   wherein the impedance matching circuit consists of a resistor having a resistance of about 467Ω; and
   wherein the first and the second hybrid transformers have a turns ratio of 1:1.60.

9. The interface adapter of claim 1,
   wherein the speaker and microphone plug cables are combined along a single cable strand.

10. The interface adapter of claim 1, further comprising:
    wherein the first hybrid transformer is rotated 90° out-of-phase with the second hybrid transformer.

11. The interface adapter of claim 1, further comprising:
    a Universal Serial Bus (USB) interface for supplying a bias voltage to the cordless telephone system through the interface adapter.

12. A cordless telephone-to-sound card interface adapter for providing mobility to an end user during voice communications over the Internet, comprising:
    a hybrid transformer circuit;
    a telephone interface coupled to the hybrid transformer circuit for coupling to a cordless telephone system;
    a speaker plug cable which terminates in a speaker miniplug which is configured to connect with a speaker jack of a computer sound card;
    a microphone plug cable which terminates in a microphone miniplug which is configured to connect with a microphone jack of the computer sound card;
    the hybrid transformer circuit including:

a first hybrid transformer having a single coil A inductively coupled to two coils B and C which are formed along the same core;

a second hybrid transformer having a single coil F inductively coupled to two coils D and E which are formed along the same core;

an impedance matching circuit having a resistance of about 467Ω;

a first terminal of the coil C and a first terminal of the coil E coupled to the telephone jack;

a second terminal of the coil C coupled to a second terminal of the coil E;

first and second terminals of the coil A coupled to the speaker plug cable;

first and second terminals of the coil F coupled to the microphone plug cable;

a first terminal of the coil B coupled to a second terminal of the coil D;

a second terminal of the coil B and a first terminal of the coil D coupled to the impedance matching circuit; and the first and the second hybrid transformers having a turns ratio of about 1:1.60.

13. The interface adapter of claim 12, wherein the hybrid transformer circuit matches impedances from the cordless telephone system and the computer sound card for voice echo cancellation.

14. The interface adapter of claim 12, wherein the speaker and microphone plug cables are combined along a single cable strand.

15. The interface adapter of claim 12, further comprising: wherein the first hybrid transformer is rotated between 45°–135° out-of-phase with the second hybrid transformer.

16. The interface adapter of claim 12, wherein the impedance matching circuit consists of a resistor having the resistance of about 467Ω and a tolerance of 1% or less.

17. The interface adapter of claim 12, further comprising: a Universal Serial Bus (USB) interface for supplying a bias voltage to the cordless telephone system through the interface adapter.

18. A hybrid transformer circuit for a cordless telephone-to-sound card interface adapter, comprising:

a first hybrid transformer having a single coil A which is inductively coupled with two coils B and C which are formed along the same core;

a second hybrid transformer having a single coil F which is inductively coupled with two coils D and E which are formed along the same core;

an impedance matching circuit;

a first terminal of the coil C and a first terminal of the coil E for coupling to a cordless telephone system;

a second terminal of the coil C coupled to a second terminal of the coil E;

first and second terminals of the coil A for coupling to a speaker jack of a computer sound card;

first and second terminals of the coil F for coupling to a microphone jack of the computer sound card;

a first terminal of the coil B coupled to a second terminal of the coil D; and a second terminal of the coil B and a first terminal of the coil D being coupled to the impedance matching circuit.

19. The hybrid transformer circuit of claim 18, further comprising:

a speaker plug cable which terminates in a ⅛ inch speaker miniplug which is configured to connect with the speaker jack of the computer sound card;

the speaker plug cable for coupling to the first and the second terminals of the coil A of the first hybrid transformer;

a microphone plug cable which terminates in a ⅛ inch microphone miniplug which is configured to connect with the microphone jack of the computer sound card; and the microphone plug cable for coupling to the first and the second terminals of the coil F of the second hybrid transformer.

20. The hybrid transformer circuit of claim 18, wherein the hybrid transformer circuit matches impedances from the cordless telephone system and the computer sound card for voice echo cancellation.

21. The hybrid transformer circuit of claim 18, wherein the impedance matching circuit has an impedance of between about 350–500Ω.

22. The hybrid transformer circuit of claim 18, wherein the impedance matching circuit consists of a resistor having a resistance of about 467Ω and a 1% tolerance or less, and the first and the second hybrid transformers have a turns ratio of 1:1.60.

23. The hybrid transformer circuit of claim 18, wherein an impedance matched to the cordless telephone system is about 450Ω, an impedance matched to the microphone jack is at least 10K Ω, and an impedance matched to the speaker jack is about 600Ω.

24. The hybrid transformer circuit of claim 18, further comprising:

a Universal Serial Bus (USB) interface coupled to one of the first terminals of coils C and E for supplying a bias voltage to the cordless telephone system.

* * * * *